United States Patent [19]

Shelley

[11] 4,365,078

[45] Dec. 21, 1982

[54] PROCESS FOR CHARGING DRY TEREPHTHALIC ACID INTO A REACTOR

[75] Inventor: Lawrence E. Shelley, Akron, Ohio

[73] Assignee: The Goodyear Tire & Rubber Company, Akron, Ohio

[21] Appl. No.: 39,039

[22] Filed: May 14, 1979

Related U.S. Application Data

[63] Continuation of Ser. No. 861,333, Dec. 16, 1977, abandoned.

[51] Int. Cl.³ .............................................. C07C 67/08
[52] U.S. Cl. ........................................ 560/94; 560/89
[58] Field of Search ........................................... 560/94

[56] References Cited

U.S. PATENT DOCUMENTS 3,617,226 11/1971 List et al. ................................ 560/98
3,842,041 10/1974 Browne et al. ........................ 560/94
3,940,431 2/1976 Wulf et al. ............................. 560/98
3,972,912 8/1976 Wulf et al. ............................. 560/98

Primary Examiner—Natalie Trousof
Assistant Examiner—Vera C. Clarke
Attorney, Agent, or Firm—D. J. Hudak; Bruce Hendricks

[57] ABSTRACT

This invention concerns a method of charging dry terephthalic acid into a reactor which may contain glycol and be under elevated pressure and elevated temperature. According to the invention a suspension of terephthalic acid in a gas such as nitrogen is formed and this suspension is charged into the reactor.

3 Claims, 1 Drawing Figure

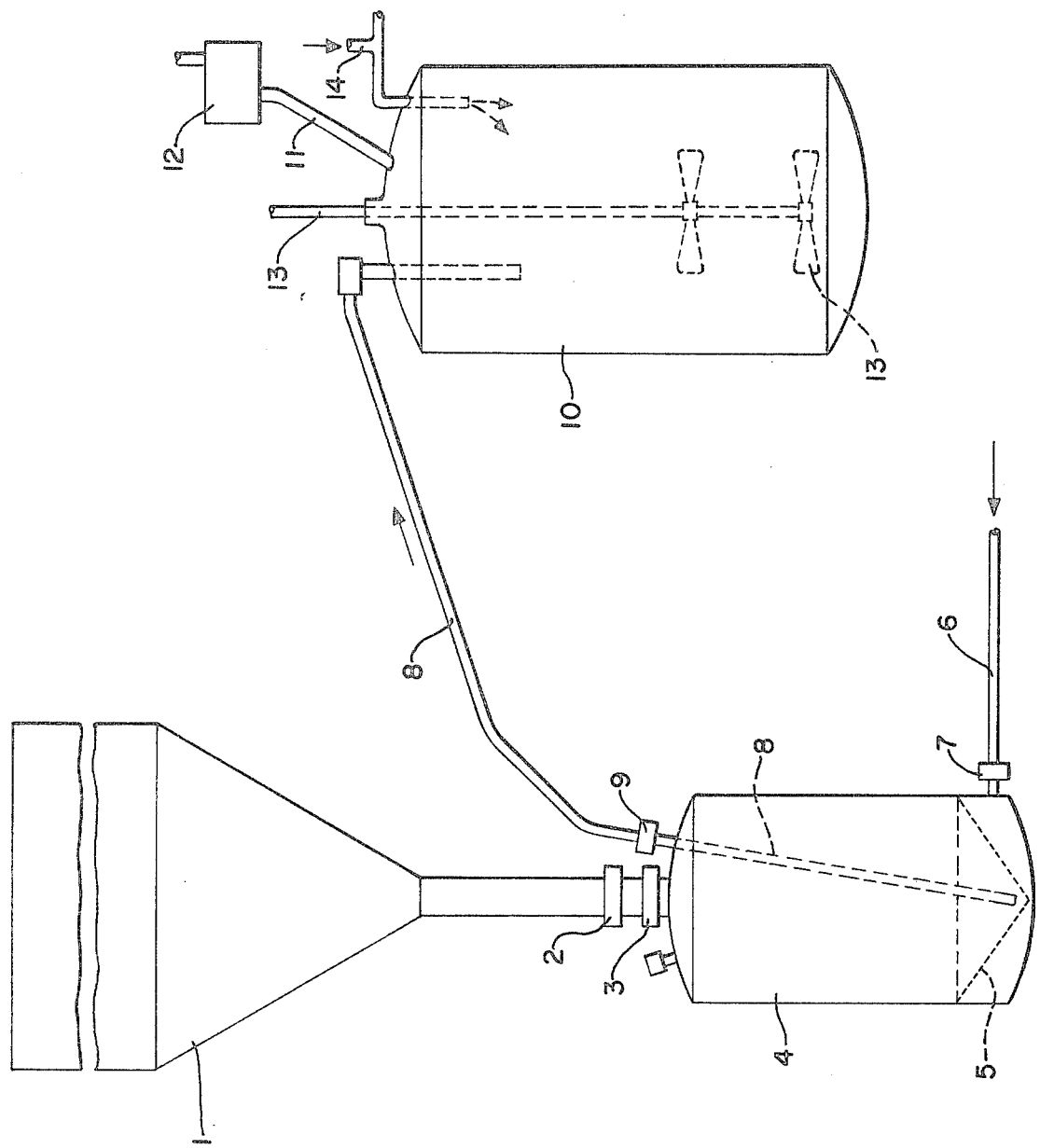

PROCESS FOR CHARGING DRY TEREPHTHALIC ACID INTO A REACTOR

This is a continuation of application Ser. No. 861,333 filed Dec. 16, 1977, now abandoned.

This invention relates to a process for charging dry terephthalic acid to a reactor. More particularly the invention relates to a process for adding dry terephthalic acid to a reactor which contains glycol.

In the preparation of polyethylene terephthalate from glycol and terephthalic acid it is desirable to use these materials in the molar ratio of 1:1 or as closely as possible to minimize side reactions such as ether formation and to avoid having to recover unused glycol. In a batch process terephthalic acid may be charged to the reactor by pumping a premixed glycol/terephthalic acid paste to the reactor or by adding preweighed amounts of reactants to a partially cooled vessel at atmospheric pressure.

Once the raw materials have been added the reactor may be brought to the desired pressure and temperature for the esterification reaction.

In a continuous process the esterification reactor must be maintained at elevated temperatures and pressure while the reactants are continuously metered into the vessel. Customarily this has been achieved by using a slurry pump which is capable of pumping a paste of glycol and terephthalic acid into a pressurized vessel. This method is limited by the fact that the paste viscosity gets very high when the ratio of glycol/terephthalic acid is low. The prior art has not provided a satisfactory solution to the problem of adding terephthalic acid to a reactor which contains hot glycol and may be under pressure.

According to the present invention glycol and terephthalic acid may be added to the esterification reactor separately. According to this invention terephthalic acid is mixed with a gas such as nitrogen under pressure to form a suspension of terephthalic acid in the gas and this suspension is metered under pressure into the esterification reactor. The glycol is separately pumped into the reactor in the proper amount to provide the desired ratio of glycol to terephthalic acid in the esterification reactor. Normally the esterification reactor is maintained under pressure and the reaction is run at a temperature in the range of about 250° to 270° C.

The invention is illustrated in the following example which is more fully explained by reference to the accompanying drawing which shows the flow of materials in the system. In the drawing it is shown that terephthalic acid is passed from storage (not shown) to an intermediate hopper 1 from which it is discharged through a double valve system 2 and 3 into weigh tank 4 where it is deposited on porous diaphragm 5 which is spaced apart from the bottom of the weigh tank 4. Nitrogen gas from storage (not shown) is passed into the bottom of weigh tank 4 through conduit 6 the activator valve 7 at a point below porous diaphragm 5. The nitrogen gas is under a pressure of about 80 psi which is sufficiently great that it passes through the diaphragm and forms a suspension of terephthalic acid and nitrogen gas. The suspension is passed through conduit 8 and discharge valve 9 into esterification reactor 10 which is equipped with a separation column 11, a condenser 12 and an agitator 13. As terephthalic acid is passed into esterification reactor 10 ethylene glycol is pumped through conduit 14 from storage, not shown, in the proper amount to provide the desired ratio of glycol to terephthalic acid. Esterification reactor 10 is maintained at a pressure of 70 psig and a temperature of about 270° C. Excess nitrogen gas is vented out of esterification reactor 10 through the column 11. In continuous operation low molecular weight polymer is continuously withdrawn from esterification reactor 10 in an amount about equal to the amount of terephthalic acid and glycol charged into the esterification reactor 10.

The above description shows that dry terephthalic acid can be charged into a vessel maintained at high temperature and pressure and that the terephthalic acid can be charged continuously. The esterification reaction is carried out using low ratios of glycol to acid preferably in the range of from about 1.05:1 to 1.7:1. Lower ratios than 1:1 can be charged successfully by use of the present system.

The invention provides several advantages over processes shown in the prior art. Glycol and terephthalic acid may be charged into a reactor in any desired ratios. In addition, the reactant vessel may be maintained at a high temperature and pressure while the dry terephthalic acid is being charged. If desired, two or more weigh tanks can be used to ensure that the terephthalic acid can charge continuously. The reactants, particularly the glycol, can be preheated to a desired temperature before being charged into the reactor and this shortens the reaction time.

Charging terephthalic acid to a reactor by the present system is accurate and reproducible. It eliminates the need for preparing slurries or pastes which when low ratios of glycol to acid are used are very viscous and difficult to convey into the reaction vessel, particularly when the vessel is under pressure.

While certain representative embodiments and details have been shown for the purpose of illustrating the invention it will be apparent to those skilled in this art that various changes and modifications may be made therein without departing from the spirit or scope of the invention.

I claim:

1. In a continuous process for reacting terephthalic acid with liquid glycol in an esterification reaction vessel maintained at elevated temperatures and pressures the improvement which comprises forming a suspension of solid particulate terephthalic acid in nitrogen gas, maintaining said suspension under pressure and charging said suspension into said reaction vessel to which liquid glycol is being charged separately.

2. The improvement of claim 1 wherein the suspension of solid particulate terephthalic acid in the nitrogen gas is maintained and charged to said reaction vessel at a pressure higher than that maintained in said reaction vessel.

3. The improvement of claim 2 wherein the liquid glycol and suspended solid particulate terephthalic acid are charged to the reaction vessel in amounts to provide a molar ratio of glycol to acid ranging from about 1:1 to about 1.7:1 in said reaction vessel.

* * * * *